United States Patent
Shinada

(10) Patent No.: US 7,839,262 B2
(45) Date of Patent: Nov. 23, 2010

(54) DEVICE FOR GIVING INFORMATION TO VEHICLE, VEHICLE AND METHOD FOR GIVING INFORMATION TO VEHICLE

(75) Inventor: Akira Shinada, Tokyo (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 10/550,290

(22) PCT Filed: Mar. 24, 2004

(86) PCT No.: PCT/JP2004/004062

§ 371 (c)(1),
(2), (4) Date: Sep. 22, 2005

(87) PCT Pub. No.: WO2004/088070

PCT Pub. Date: Oct. 14, 2004

(65) Prior Publication Data

US 2006/0192650 A1 Aug. 31, 2006

(30) Foreign Application Priority Data

Mar. 31, 2003 (JP) ............................. 2003-093104

(51) Int. Cl.
*G05B 19/00* (2006.01)
(52) U.S. Cl. ............................. 340/5.2; 701/1; 340/5.72
(58) Field of Classification Search .................. 701/1; 340/531, 5.2, 5.72, 425.5, 901, 5.1, 426.15, 340/5.6, 5.7, 5.61, 5.62; 455/41.2, 41.3, 455/575.9, 557, 345, 569.1
See application file for complete search history.

(56) References Cited

U.S. PATENT DOCUMENTS

| 4,714,925 | A | * | 12/1987 | Bartlett | .................... 340/10.33 |
| 4,761,645 | A | | 8/1988 | Mochida | |
| 4,763,121 | A | | 8/1988 | Tomoda et al. | |
| 5,046,007 | A | * | 9/1991 | McCrery et al. | .............. 701/35 |
| 2001/0028297 | A1 | * | 10/2001 | Hara et al. | .................. 340/5.62 |
| 2002/0184062 | A1 | * | 12/2002 | Diaz | ............................. 705/7 |
| 2002/0197955 | A1 | * | 12/2002 | Witkowski et al. | ............. 455/41 |

FOREIGN PATENT DOCUMENTS

| DE | 197 35 658 C1 | 7/1998 |
| DE | 199 39 064 A1 | 2/2001 |
| EP | 1 043 464 | 10/2000 |
| JP | 2001-112071 | 4/2001 |
| JP | 2001-112071 A * | 4/2001 |
| JP | 2001-152718 | 6/2001 |
| JP | 2002-187523 | 7/2002 |
| JP | 2002-274293 | 9/2002 |
| JP | 2003-44661 | 2/2003 |

* cited by examiner

*Primary Examiner*—Brian A Zimmerman
*Assistant Examiner*—Yong Hang Jiang
(74) *Attorney, Agent, or Firm*—Oblon, Spivak, McClelland, Maier & Neustadt, L.L.P.

(57) ABSTRACT

The present invention is particularly applied to a vehicle relating to a key-less entry system, and desired information is provided to a vehicle 5 corresponding to the information by monitoring a remote control signal from an electronic key 2 for the key-less entry system, and starting up operations in response to this remote control signal as a trigger.

20 Claims, 6 Drawing Sheets

DEVICE FOR GIVING INFORMATION TO VEHICLE, VEHICLE AND METHOD FOR GIVING INFORMATION TO VEHICLE

TECHNICAL FIELD

The present invention relates to an information providing apparatus for a vehicle, a vehicle, and a method of providing information to the vehicle, and more particularly can be applied to vehicles having a key-less entry system. With the present invention, invention can easily be provided to vehicles without causing troubles to a user by monitoring a remote control signal from an electronic key for a key-less entry system, starting up operations in response to this remote control signal as a trigger, and providing desired information to a corresponding vehicle.

BACKGROUND ART

There has been used a key-less entry system for improving usability of vehicles. Namely in the key-less entry system, a door can be locked and unlocked by operating an operator provided as an electronic key in the remote control mode, so that the door can be operated without inserting a key into a key hole provided on the door.

In relation to the key-less entry system, for instance, Japanese Patent Laid-open No. 2001-112071 proposes a method of utilizing the key-less entry system for home automation by detecting a remote control system generated by operating an electronic key to detect arrival of a user and switching setup of interior facilities such as interior lighting.

A driver of a vehicle sometimes hopes to enjoy music contents or video contents while driving the vehicle. Further a driver checks electronic mails and further checks various types of documents. In the cases as described above, because a car for company use is used by a plurality of users, it is required to prepare various types of information to satisfy needs of the users.

Currently, there is only one method available for providing various types of information to a user on a vehicle, and in this method the user accesses servers or the like via, for instance, a mobile telephone network so that desired information is downloaded in response to operations of the user on a vehicle.

It would be more convenient, if information can be provided to vehicles without requiring any specific operation by a user.

DISCLOSURE OF INVENTION

The present invention was made in the light of the circumstances as described above, and proposes an information providing apparatus for a vehicle, a vehicle, and a method of providing information to the vehicle without requiring any specific operation by a user.

To achieve the object as described above, the present invention is applied to an information providing apparatus for a vehicle for transmitting desired information to information equipment loaded on the vehicle. The information providing apparatus includes communication means for sending and receiving desired data by means of radio communications, and control means for controlling operations of information output means for storing the information and sending said information to the vehicle as well as operations of the communication means. The control means monitors a remote control signal from the electronic key relating to a key-less entry system via the communication means, and the control means starts up operations of the information output means according to the remote control signal from the electronic key as a trigger to transmit the desired information to the vehicle.

With the configuration according to the present invention, the present invention is applied to an information providing apparatus for a vehicle for transmitting desired information to information equipment loaded on the vehicle. The information providing apparatus includes communication means for sending and receiving desired data by means of radio communications, and control means for controlling operations of information output means for storing the information and sending said information to the vehicle as well as operations of the communication means. The control means monitors a remote control signal from the electronic key relating to a key-less entry system via the communication means, and the control means starts up operations of the information output means according to the remote control signal from the electronic key as a trigger to transmit the desired information to the vehicle, so that a user can easily build a system by effectively using a key-less entry system to provide information to the vehicle not requiring any specific operation to the user.

Further the present invention is applied to a vehicle capable of downloading desired information stored in prespecified information storage means, and the vehicle according to the present invention includes communication means for receiving a remote control signal from an electronic key relating to a key-less entry system and control means for sending and receiving desired data via the communication means. The control means executes an operation for locking a door with the remote control signal from the corresponding electronic key detected via the communication means and acquires desired information received by the communication means according to the remote control signal as a trigger.

Because of the feature, with the present invention, it is possible to provide a vehicle capable of easily providing information to the vehicle without requiring any specific operation to a user by building a system effectively using the key-less entry system.

Further the present invention is applied to a method of providing to a vehicle by transmitting desired information stored in prespecified information storage means to the vehicle. In the method according to the present invention, operations of the information storage means are started up in response to a remote control signal from an electronic key relating to a key-less entry system as a trigger, and the desired information is provided to the vehicle corresponding to the remote control signal.

Because of the feature, with the present invention, it is possible to provide an information providing apparatus for a vehicle capable of easily providing information to the vehicle without requiring any specific operation to a user by building a system effectively using the key-less entry system.

BEST MODE FOR CARRYING OUT THE INVENTION

Embodiments of the present invention are described in detail below with reference to the related drawings.

(1) First Embodiment (1-1) Configuration of the First Embodiment

Figure 1:
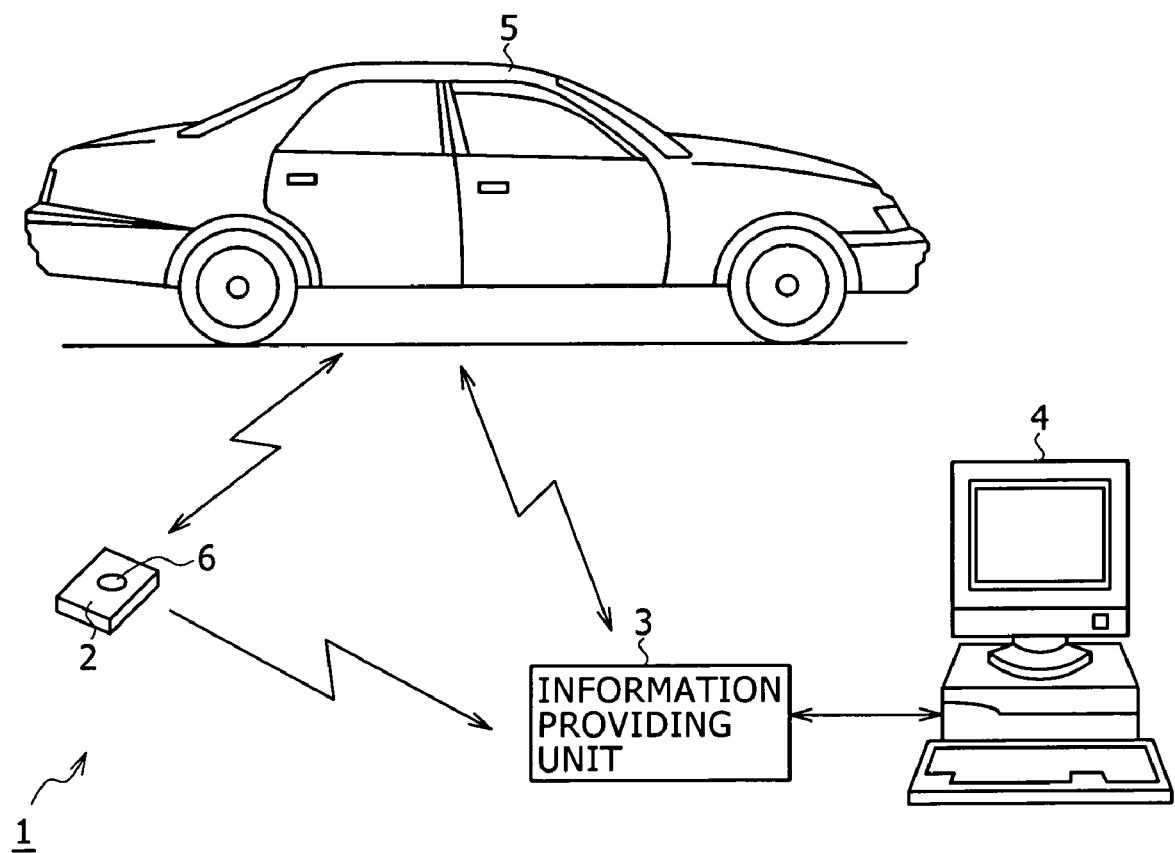
FIG. 1 is a general diagrammatic view showing an information providing system according to a first embodiment of the present invention.

FIG. 1 is a general diagrammatic view showing an information providing system according to a first embodiment of the present invention. This information providing system 1 provides various types of information from a prespecified computer 4 to a vehicle 5 by monitoring an operation of an electronic key 2 with an information providing unit 3 in response to an operation of this electronic key 2 as a trigger.

The electronic key 2 is one for a key-less entry system, and is, for instance, a remote commander for at least locking and unlocking a door of the vehicle 5 with a remote control signal based on, for instance, infrared ray. The electronic key 2 has a plate-like form with a prespecified thickness, and can lock or unlock a door of the vehicle 5 when the electronic key is approached and a pressed operation element 6 provided on a surface of the electronic key is pressed. Because of the features, the electronic key 2 can be used as a key for the vehicle 5. Therefore the electronic key 2 can execute such processing as authentication for the locking and unlocking processing.

Figure 2:
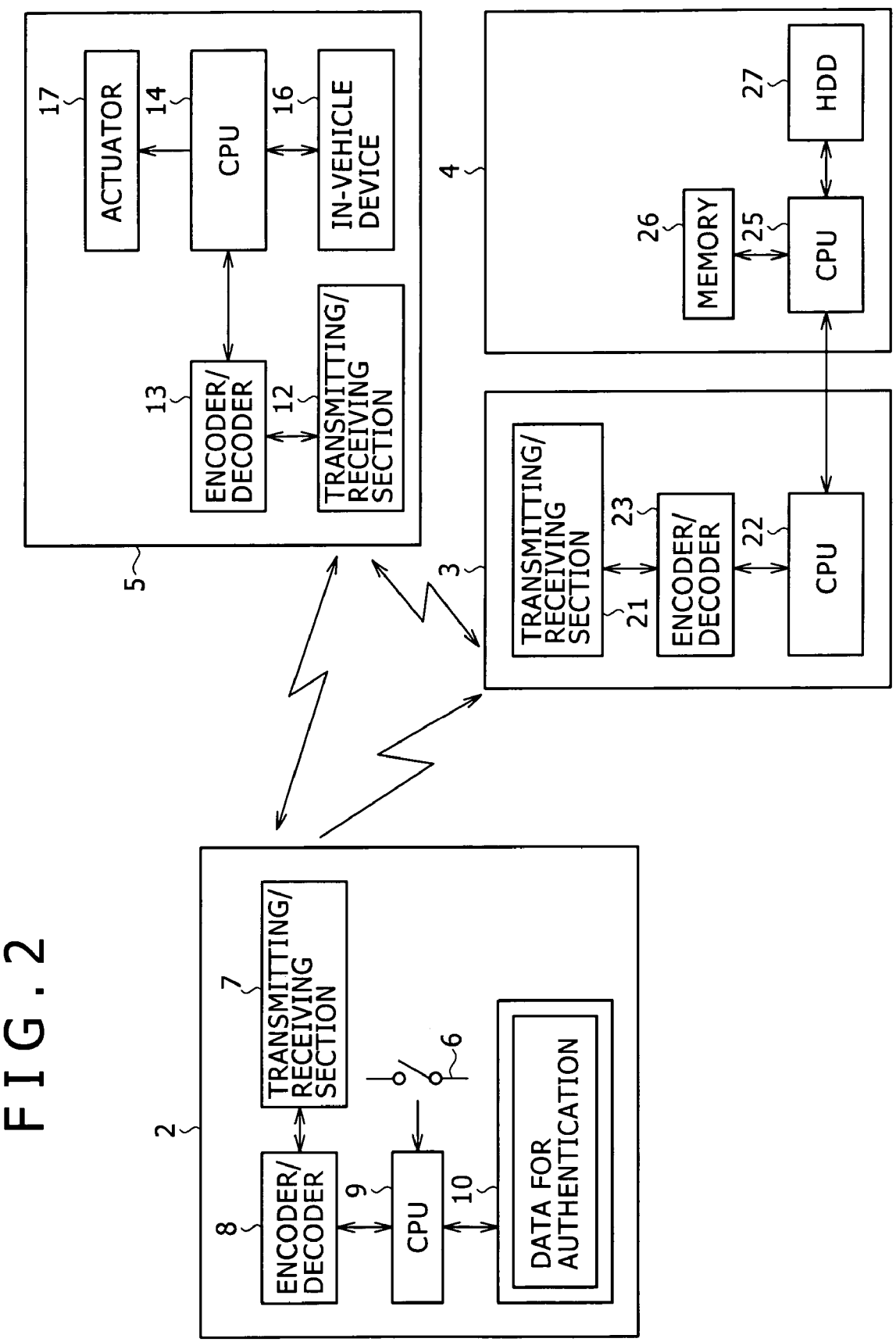
FIG. 2 is a block diagram showing the information providing system shown in FIG. 1.

Namely, as shown in FIG. 2, in the electronic key 2, a transmitting/receiving section 7 subjects output data outputted from an encoder/decoder 8 according to control by a central processing unit 9 to signal processing and outputs a remote control signal based on infrared ray. The transmitting/receiving section 7 also receives a remote control signal sent from the vehicle 5 and based on infrared ray, notifies the central processing unit 9 of the remote control signal, and further subjects the remote control signal to signal processing to output a result of the processing to the encoder/decoder 8.

The encoder/decoder 8 switches operation according to control by the central processing unit 9, modulates data outputted from the central processing unit 9, and outputs the modulated data to the transmitting/receiving section 7. The encoder/decoder 8 also processes the output data from the transmitting/receiving section 7, decodes data transmitted from the vehicle 5, and outputs the data to the central processing unit 9. Because of the features, the electronic key 2 can transmit and receive various types of data to and from the vehicle 5 via the transmitting/receiving section 7 and encoder/decoder 8 according to control by the central processing unit 9.

The central processing unit 9 constitutes a computer controlling operations of the electronic key 2 together with a memory 10 storing therein a control program for the central processing unit 9 and data for authentication. Namely, the central processing unit 9 starts up operations in response to an operation of the operation element 6, transmits and receives various types of data to and from the vehicle 5 via the encoder/decoder 8 and transmitting/receiving section 7 to instruct an operation for the door lock to the vehicle 5. In this processing, the central processing unit 9 transmits the data for authentication stored in the memory 10 to the vehicle 5. The data for authentication is used for authentication of the electronic key 2, and is configured of code specific to the electronic key 2. Because of the feature, the electronic key 2 executes the processing for authentication based on the data for authentication with the vehicle 5, and therefore only the vehicle corresponding to the electronic key 2 can be subjected to operations for locking or unlocking the door thereof.

In response to the configuration of the electronic key 2 as described above, in the vehicle 5, a transmitting/receiving section 12 receives a remote control signal based on infrared ray transmitted from the electronic key 2 or the information providing unit 3, and notifies a central processing unit 14 of reception of the signal. Further the transmitting/receiving section 12 subjects the received remote control signal to signal processing, and outputs a result of the processing to the encoder/decoder 13. Further the transmitting/receiving section 12 subjects output data outputted from the encoder/decoder 13 to signal processing and outputs a remote control signal based on infrared ray.

The encoder/decoder 13 switches operations thereof according to control by a central processing unit 14, modulates data outputted from the central processing unit 14, and outputs the modulated data to the transmitting/receiving section 12. Further the encoder/decoder 13 processes output data from the transmitting/receiving section 12, decodes data transmitted from the electronic key 2 or information providing unit 3, and outputs the decoded data to the central processing unit 14.

An in-vehicle device 16 is information-processing equipment loaded on this vehicle 5, which processes information provided from the computer 4. In this embodiment, various types of data such as schedules, electronic mails, various document data, video contents, audio contents data, positional data for destinations are provided from the computer 4, and the in-vehicle device 16 includes a computer with software for checking and managing schedules, electronic mails, and various documents implemented therein; AV equipment for storing video contents and audio contents in a large capacity storage medium such as a hard disk device to present the contents to persons on the vehicle; and a car navigation device for, for instance, guiding the vehicle to a destination based on positional data for the destination.

An actuator 17 includes a plunger for locking or unlocking a door of the vehicle and the like, and because of this configuration, in this embodiment, the door lock can be operated by driving the actuator 17.

The central processing unit 14 constitutes a computer together with a memory not shown, and controls the door lock or other components of the vehicle 5 by executing the processing sequence with a processing program stored in this memory. The processing program is previously installed in the memory constituting the computer for providing to the user, or can be provided to the user by installing a program downloaded with a communication unit not shown via a network such as the Internet or installing a program provided to a user in the state where the program is stored in various types of recording media. Various types of recording media such as a magnetic disk, an optical disk, a magnetic tape and the like can be used as a recording medium available for the purpose as described above.

Figure 3:
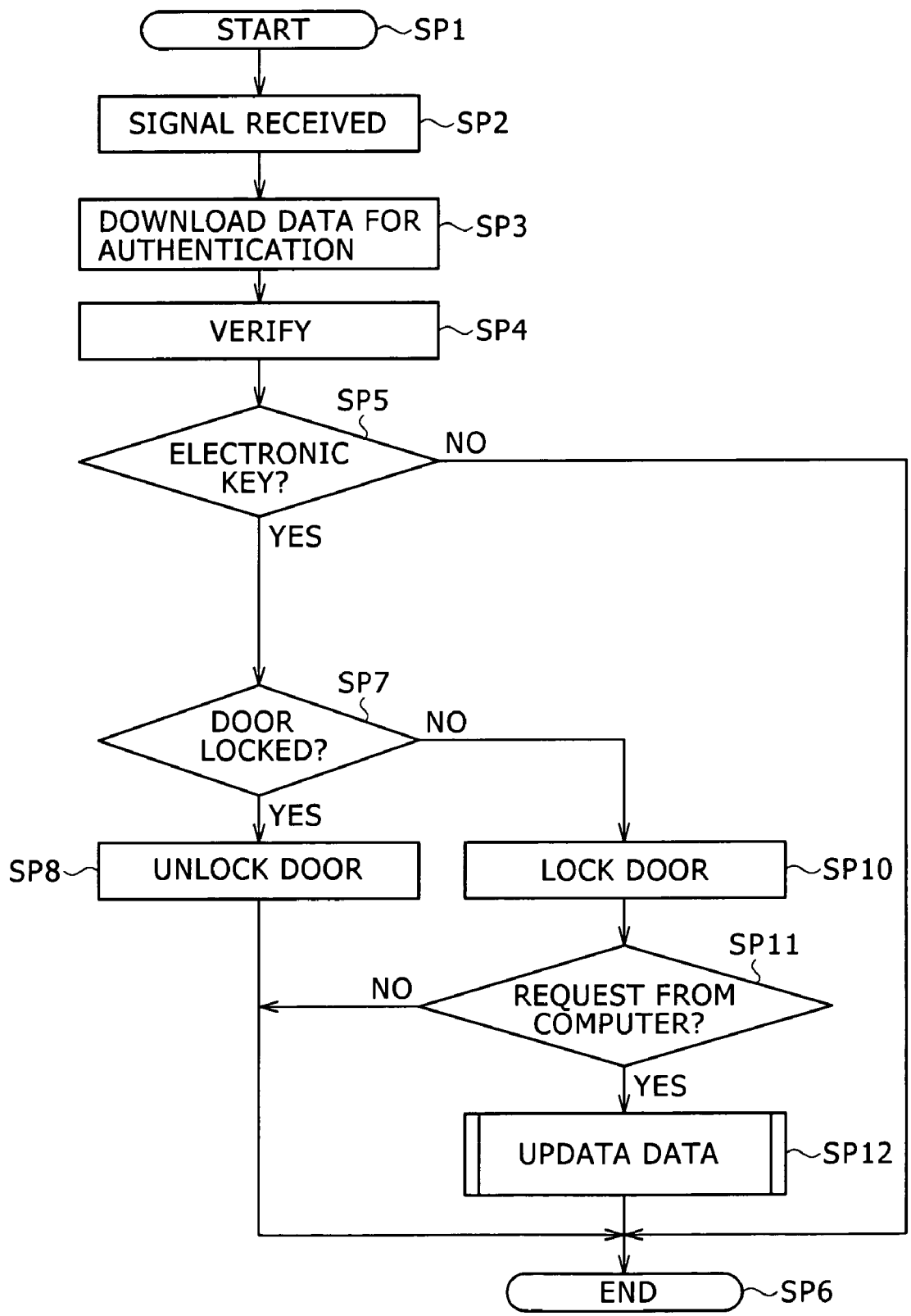
FIG. 3 is a flow chart illustrating a processing sequence by a central processing unit in a vehicle in the information providing system shown in FIG. 2.

FIG. 3 is a flow chart showing the processing sequence of operations of the electronic key 2 by the central processing unit 14. When reception of a remote control signal is notified from the transmitting/receiving section 12 to the central processing unit 14, the processing flows from step SP1 to step SP2, and the central processing unit 14 instructs the transmitting/receiving section 12 to receive the remote control signal, and also instructs the encoder/decoder 13 to process the received signal. In step SP3, the central processing unit 14 acquires data for authentication transmitted from the electronic key 2, and then in step SP4, verifies the data for authentication to data for authentication previously registered.

Then in step SP5, the central processing unit 14 determines based on a result of verification in step SP4 whether the remote control signal received by the transmitting/receiving section 12 is from the electronic key 2 corresponding to the vehicle 5 or not, and when it is determined that the remote control signal is not from the electronic key 2 corresponding to the vehicle 5, the processing flows from step SP5 to step SP6, and the processing sequence is terminated.

On the contrary, when it is determined in step SP5 that the remote control signal is from the electronic key 2 corresponding to the vehicle 5, the processing by the central processing unit 14 flows to step SP7. In step SP7, the central processing unit 14 determines whether the door is currently locked or not. When it is determined that the door is currently locked, it is determined that the user has instructed to unlock the door, and the processing by the central processing unit 14 flows from step SP7 to step SP8, and the central processing unit 14 unlocks the door by driving the corresponding actuator 17. Then the processing flows to step SP6 and the processing sequence is terminated.

On the contrary, when it is determined that the door is not locked currently, it is determined that the user has instructed to lock the door, and the processing by the central processing unit 14 flows from step SP7 to step SP10, and the central processing unit 14 locks the door by actuating the corresponding actuator 17. With the operations described above, in the vehicle 5, the door can be locked by operating the corresponding electronic key 2.

When the door is locked as described above, it is determined that the user has returned from a place where the user has gone and also that the vehicle 5 is left in the state for a while, and also it is determined that, even when various types of information are provided to the vehicle 5 at a relatively low transfer rate, there is a sufficient time allowance for updating the information.

In this case, the central processing unit 14 determines in the next step SP11 whether a request for updating from the computer 4 is made within a prespecified period of time or not. When a request from the computer 4 is not made within the prespecified period of time, it is determined, for instance, that the vehicle 5 is now parking at a different place from a place where the computer 4 is installed, and the processing by the central processing unit 14 flows to step SP6 with the processing sequence terminated.

On the contrary, when it is determined in step SP11 that a request from the computer 4 is made within the prespecified period of time, the processing flows to step SP12, and the central processing unit 14 executes the data update processing for uploading data such as schedules and the like from the computer 4, and then the processing flows to step SP6 with the processing sequence terminated.

Figure 4:
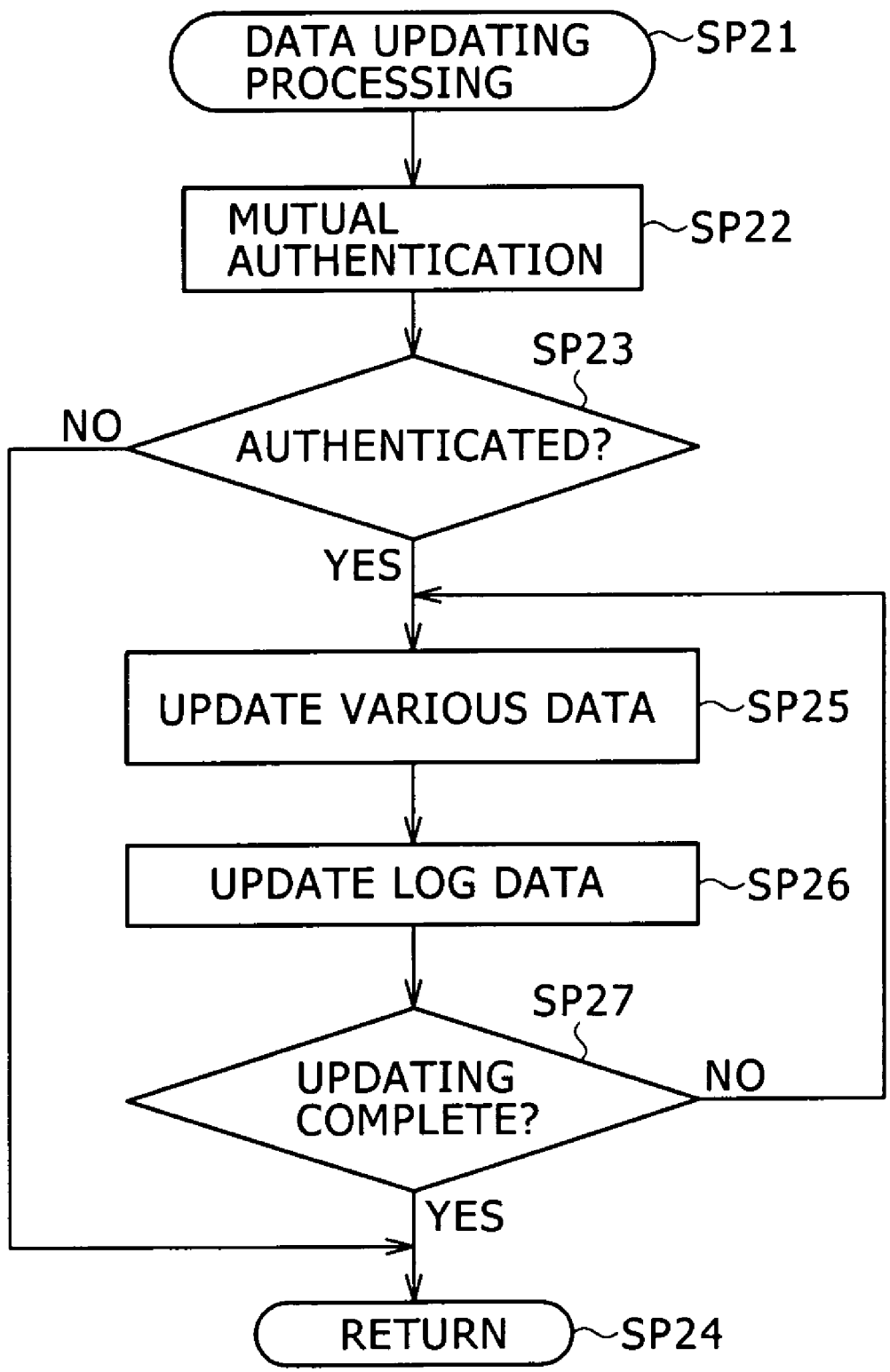
FIG. 4 is a flow chart showing data update processing in the processing sequence shown in FIG. 3.

FIG. 4 is a flow chart showing the processing sequence by the central processing unit 14 in the data update processing. When the central processing unit 14 starts this data update processing, the processing flows from step SP21 to step SP22. In this step, the central processing unit 14 executes the processing for mutual authentication by transacting data for authentication and the like with the computer 4 sending the request in step SP11 described above, and determines in the next step SP23 whether the mutual authentication has been made correctly or not. When it is determined in this step that the mutual authentication has not been made correctly, the processing by the central processing unit 14 returns from step SP23 to step SP24 to restart the previous processing sequence. With the operations, in the information providing system 1, information for the vehicle 5 can accurately be provided to the vehicle 5 which is an object for operations of the electronic key 2.

On the contrary, when it is determined that the mutual authentication has been made correctly, the central processing unit 14 stores, in step SP 25, information transmitted from the computer 4 in the in-vehicle device 16 received and corresponded via the transmitting/receiving section 12 and encoder/decoder 13, and stores, in the subsequent step SP26, this update as a history. Further the central processing unit 14 determines in the next step SP 27 that the update is completed or not by means of data exchange with the computer 4. When it is determined that the update is not completed, the processing returns to step SP25, while in turn, when it is determined that the update is completed, the processing flows to step SP24 to restart the previous processing sequence. With the processing sequence as described above, the vehicle 5 can receives various types of data transmitted from the computer 4 via the communication units 12, 13 for the key-less entry system. With the configuration as described above, the computer 4 monitors operations of the electronic key 2 with the information providing unit 3, and provides data such as schedules to the vehicle 5 via the information providing unit 3.

The information providing unit 3 is an external device which can be connected to the computer 4, and is installed, for instance, at a parking area. The information providing unit 3 monitors a remote control signal with the electronic key 2, and when a remote control signal for the electronic key 2 having been registered previously is received, the information providing units starts up the computer 4 from the stand-by state, transfers the data outputted from the computer 4 like a remote control signal from the electronic key 2 to the vehicle 5, and further notifies various data transferred from the vehicle 5 to the computer 4.

Namely in the information providing unit 3, a transmitting/receiving section 21 switches the operation according to control by a central processing unit 22, generates and transmits a remote control signal based on infrared ray through output data from an encoder/decoder 23, and further receives a remote control signal and outputs the received remote control signal.

The encoder/decoder 23 switches the operation according to control by the central processing unit 22, modulates the output data from the central processing unit 22, outputs the modulated data to the transmitting/receiving section 21, and further outputs the data received from the remote control signal obtained by processing the received remote control signal from the transmitting/receiving section 21 to the central processing unit 22.

The central processing unit 22 is a control circuit for controlling operations of the information providing unit 3, and when reception of a remote control signal is notified from the transmitting/receiving section 21, the central processing unit 22 instructs the encoder/decoder 23 to execute the processing according to the remote control signal. With this operation, the central processing unit 22 acquires data for authentication or the like transmitted from the electronic key 2, and determines whether the electronic key 2 transmitting the remote control signal corresponds to the vehicle 5 as a target for transmission of various data such as schedules from the computer 4 or not. Verification of a vehicle with the electronic key 2 is performed by comparing the acquired data for authentication to those previously registered therein, and previous registration of data for authentication can be executed, for instance, by operating a keyboard of the computer 4 or by acquiring data for authentication by operating the electronic key 2 in the registration mode.

When the electronic key 2 is authenticated as described above, the central processing unit 22 instructs the computer 4 set in the stand-by state to start up operations by starting an application program for the information providing system 1. When the computer is started up, the central processing unit 22 sends information identifying the electronic key 2 having transmitted a remote control signal to the computer 4, transfers various types of data outputted from the computer 4 via the encoder/decoder 23 and transmitting/receiving section 21 to the vehicle 5, further sends a response obtained from the vehicle 5 in response to the notification to the computer 4, and with the operations as described above data such as schedules outputted from the computer 4 is uploaded to the vehicle 5.

In contrast, the computer 4 is installed, for instance, indoors with the information providing unit 3 connected thereto with a prespecified interface, and executes various types of processing programs stored in a work area in a memory 26 of a hard disk drive (HDD) 27 with the central processing unit 25. Of these processing programs, those for the central processing unit 25 for the information providing unit 3 are previously installed in the computer 4 or are provided by installing programs downloaded via a network such as the Internet with a communication unit not shown, or by installing programs previously recorded in various types of recording media. Various types of recording media such as a magnetic disk, an optical disk, a magnetic tape and the like may be used each as a recording medium for the purpose described above.

In the computer 4, when an application program for the information providing system 1 is started up and no input is provided within a prespecified period of time, the central processing unit 25 switches the operation mode to the so-called stand-by state to reduce the power consumption in the entire system. In the stand-by state, when an instruction for a start is issued from the information providing unit 3, the central processing unit 25 starts up and executes a prespecified processing sequence for the application program.

Figure 5:
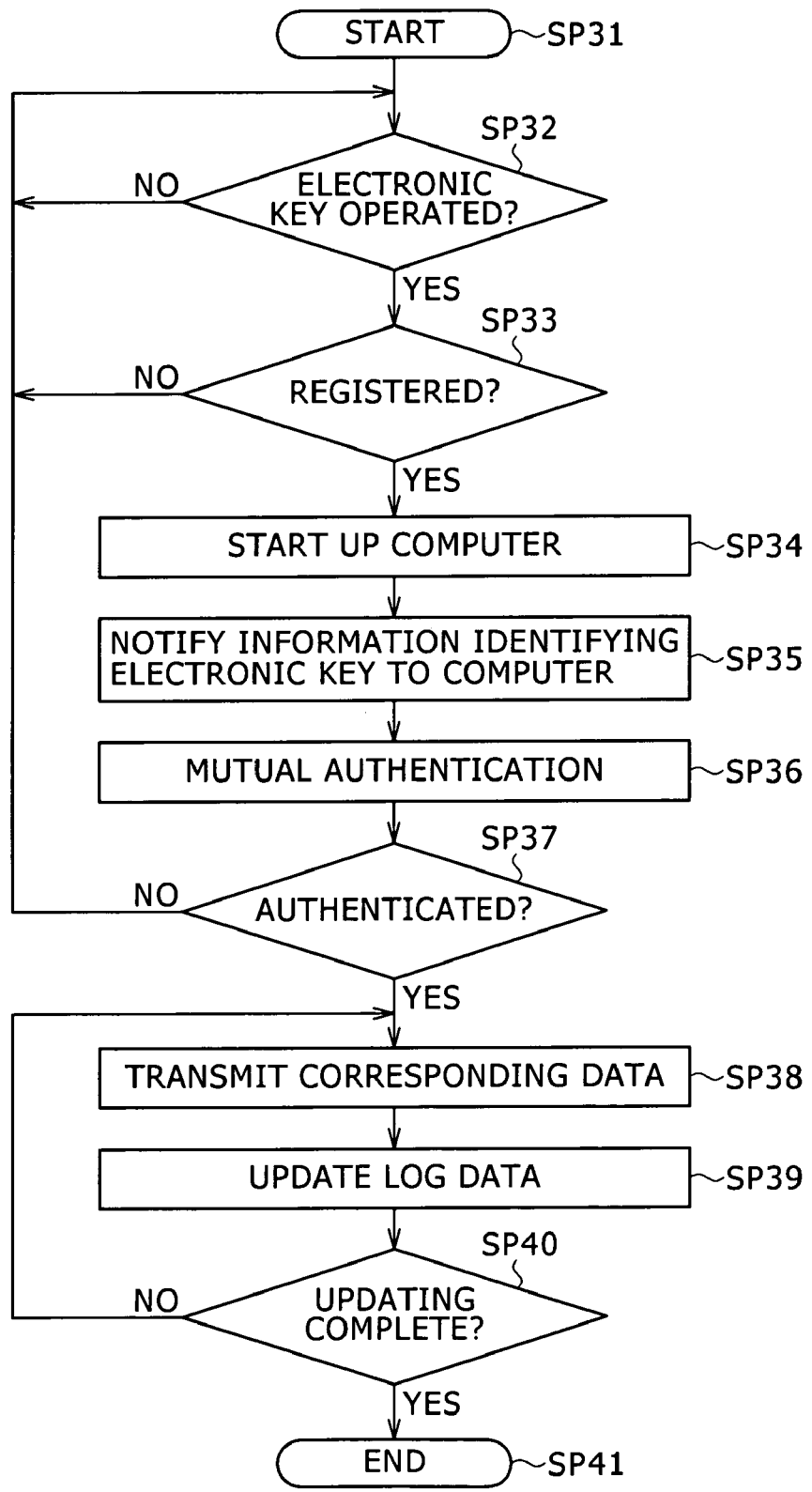
FIG. 5 is a flow chart showing a processing sequence by the central processing unit in a computer for the information providing system and the information providing unit shown in FIG. 2.

FIG. 5 is a flow chart showing a processing sequence for the processing steps executed by the central processing unit 22 in the information providing unit 3 and the central processing unit 25 in the computer 4. Namely, in the computer 4, when the processing sequence is started, the processing flows from step SP31 to step SP32, and the central processing unit 22 in the information providing unit 3 monitors an operation of the electronic key 2 via the transmitting/receiving section 21 and encoder/decoder 23. When a remote control signal generated in response to an operation of the electronic key 2 is detected, the processing flows to step SP33, and the central processing unit 22 in the information providing unit 3 determines based on the data for authentication transmitted from the electronic key 2 whether the remote control signal is from the registered electronic key 2 or not. When it is determined that the remote control signal is not from the registered electronic key 2, it is determined that any other car accidentally enters a parking area to which the information providing system 1 relates and that a driver of the vehicle operates an electronic key for the vehicle. In this case, the processing returns from step SP33 to step SP32 to again monitor an operation of the electronic key 2.

When it is determined in step SP33 that the remote control signal is from the registered electronic key 2, the central processing unit 22 in the information providing unit 3 instructs the computer 4 to start up, and the central processing unit 25 in the computer 4 starts the operation from the stand-by state. When the central processing unit 25 starts up its operations, the central processing unit 25 notifies start-up of the operation to the central processing unit 22, and in response to this notification, in the following step SP35, information identifying the electronic key 2 having transmitted the remote control signal is sent to the computer 4.

In response to the operation above, the central processing unit 25 in the computer 4 identifies the vehicle 5 corresponding to the electronic key 2 from the information identifying the electronic key 2 sent from the information providing unit 3 by executing the application program for the information providing unit 3. In the next step SP36, the central processing unit 25 in the computer 4 executes processing for mutual authentication with the vehicle 5 based on a result of identification by transacting authentication data previously registered via the information providing unit 3. In the next step SP37, the central processing unit 25 determines whether mutual authentication has been performed properly or not.

When it is determined in this step that mutual authentication has not been performed properly, it is determined, for instance, that the electronic key 2 for a vehicle not being parked in a zone covered by the information providing system 1 was operated by mistake, the processing by the central processing units 22, 25 returns to step SP32. In response to this operation, the computer 4 switches the operation mode to the stand-by state after a prespecified period of time has passed. The central processing unit 22 in the information providing unit 3 again monitors an operation of the electronic key 2.

On the contrary, when it is determined in step SP37 that mutual authentication has been performed properly, the processing by the central processing unit 25 flows to step SP38. In this step, the central processing unit 25 detects a driver who uses the vehicle 5 in succession from the schedule of the vehicle 5. Further for the driver detected as described above who uses the vehicle 5 in succession, a schedule of the driver, electronic mails addressed to the driver, various document data, various documents instructed by the driver, data such as video contents and audio contents, positional data for a destination for the driver are searched, and of these data, those not updated yet in the vehicle are detected.

When data to be updated is detected as described above, the central processing unit 25 transmits the data to the corresponding vehicle 5 via the information providing unit 3, and updates the log data in the next step SP39. Further in the next step SP40, whether all of data have been updated or not is determined, and when it is determined that all of the data have not been updated, the processing returns to step SP38. On the contrary, when it is determined in step SP40 that all of the data have been updated, the central processing unit 25 reports completion of updating to the vehicle 5, and then the processing flows to step SP41 with the processing sequence terminated.

(1-2) Operations in the First Embodiment

With the configuration as described above, in the vehicle 5 relating to the information providing system 1, when a remote control signal based on infrared ray is transmitted from the electronic key 2 in response to an operation of the operation element 6 provided in the electronic key 2, the door is locked or unlocked, so that the door can be operated with the key-less entry system without inserting a key into a keyhole.

In the information providing system 1, an operation for the electronic key 2 for a key-less entry system as described above is monitored by the information providing unit 3 with the computer 4 connected thereto. When a remote control signal from the electronic key 2 is received by the information providing unit 3 as a result of monitoring, the computer 4 starts up from the stand-by state, and various types of information recorded in a hard disk device 27 of the computer 4 are transmitted to the vehicle 5. With this operation, the information providing system 1 monitors a remote control signal from the electronic key 2 for the key-less entry system, and starts up operations according to the remote control signal as a trigger to provide desired information to the corresponding vehicle, so that information can easily be provided to the vehicle without requiring any specific operation to the user.

In the step of providing information according to a remote control signal as a trigger as described above, when the remote control signal is detected by the information providing unit 3, the information providing system 1 determines based on data for recognition whether the remote control signal has been generated in response to an operation of the electronic key 2 registered in the information providing system 1 or not, and only when the remote control signal is generated in response to an operation of the electronic key 2 already registered, the processing for providing information is executed. Because of the feature, when the electronic key 2 for a vehicle accidentally entering into a parking area for the vehicle 5 is operated, the information providing system 1 does not provide any information, so that privacy of a driver using the vehicle 5 is protected, and further security of the various information is insured.

When it is confirmed that the remote control signal is from the registered electronic key 2, information identifying the electronic key 2 based on data for authentication obtained when receiving the remote control signal is notified from the information providing unit 3 to an application program in the computer 4 having started up from the stand-by state. Further based on this notification, the vehicle 5 corresponding to the electronic key 2 is identified in the computer 4 with mutual authentication with the vehicle 5 executed, and only when the mutual authentication is made properly, information is provided. Because of this feature, when there are a plurality of vehicles 5 to which information may be transmitted, or to effectively prevent illegal use of a third party having malicious intent, information can accurately be provided only to the proper vehicle 5.

As described above, in a sequence of data communications between the vehicle 5 and the computer 4 after an operation of the door lock in response to an operation of the electronic key 2, the transmitting/receiving section 12 and the encoder/decoder 13 relating to a key-less entry system are employed in the vehicle 5, while the information providing unit 3 provided for detecting an operation of the electronic key 2 is employed in the computer 4, and because of the feature, the information providing system 1 effectively uses configuration of the key-less entry system to provide information to the vehicle 5.

(1-3) Advantages of the First Embodiment

With the configuration described above, information can be easily provided to a vehicle by monitoring a remote control signal from an electronic key relating to a key-less entry system and starting up operations of a computer according to this remote control signal as a trigger to provide desired information to the vehicle without requiring any specific operation by a user.

In this case, a system can be built effectively using configuration of the key-less entry system by providing information to a vehicle via a communication unit relating to the key-less entry system.

Information for a vehicle can be surely provided thereto, by identifying a vehicle relating to a remote control signal in response to an operation of an electronic key, and providing desired information to the vehicle based on a result of the identification.

Security of various information can be ensured by providing desired information, after freshly executing processing for mutual authentication between a computer and a vehicle, based on a result of processing for the mutual authentication.

(2) Second Embodiment

In this embodiment, when the processing for updating described above in the first embodiment is carried out, driving data is also provided from the vehicle 5 to the computer 4. The driving data includes data on driving distances, driving time, driving areas, and the like of the vehicle 5, and because of this feature, this embodiment uploads the driving data to the computer 4, so that the driving data is of help to daily driving control, and further can be used as basis of premium.

Figure 6:
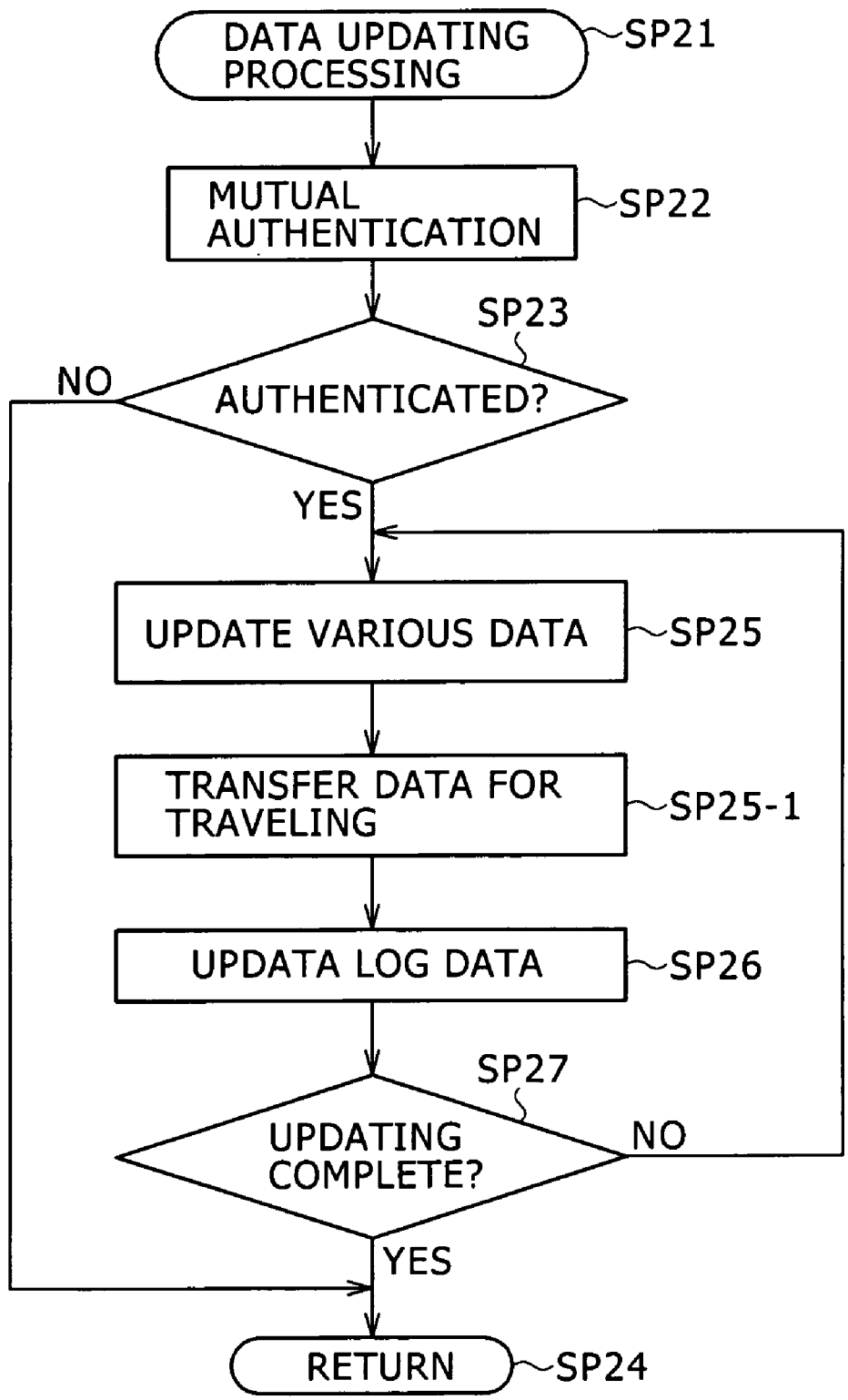
FIG. 6 is a flow chart showing a data update processing in an information providing system according to a second embodiment of the present invention.

Namely, FIG. 6 is a flow chart showing a processing sequence for a computer in a vehicle according to a second embodiment by contrast with FIG. 4. It is to be noted that this embodiment is configured similarly to the first embodiment, except the point that processing relating to the driving data is different from each other.

Namely in this case, a central processing unit constituting a vehicle and a computer starts processing for an update, executes processing for mutual authentication, then updates various data based on a result of the mutual authentication in step SP25, and transfers driving data from the vehicle to the computer in the next step SP25-1.

The same advantage as that of the first embodiment can be obtained by transmitting information also from the vehicle as described above.

(3) Third Embodiment

In this embodiment, when an electronic key is operated, desired information is updated in the same way as that in the first or second embodiment. On the other hand, when a door is locked by operations other than that of an electronic key, for instance, in a case where the door is locked by inserting a key in a keyhole thereof, desired information is updated in response to a request from a vehicle. Even in this case, like the case of the operation with an electronic key, a computer executes processing for mutual authentication with the vehicle, and then executes an update based on a result of the processing.

Because of this feature, this embodiment can obtain the same advantage as that of the first embodiment, even when a door is locked not by an electronic key but by other operations.

(4) Other Embodiments

In the embodiments described above, descriptions assume a case where schedules or other data are updated when the door of a vehicle is locked, but the present invention is not limited to this configuration, and the present invention can be applied to the configuration in which schedules or other data are updated when a door is unlocked, on the condition that data can be updated at a high speed sufficient for a practical use.

In the embodiments described above, descriptions assume a case where desired information is updated from a computer using a transmitting/receiving section relating to a key-less entry system, but the present invention is not limited to this configuration, and the present invention can be applied to the configuration in which a transmitting/receiving section is additionally provided for updating date.

In the embodiments described above, descriptions assume a case where the present invention is applied to a key-less entry system based on an infrared remote control signal, but the present invention is not limited to this configuration, and the present invention can be applied to the key-less entry system based on a remote control signal by means of radio communications.

In the embodiments described above, descriptions assume a case where schedules, electronic mails and other data are updated, but the present invention is not limited to this configuration, and the present invention can be broadly applied to updating of, for instance, various information such as driving schedules of a vehicle, information on an in-vehicle environment, and the like.

In the embodiments described above, descriptions assume a case where the present invention is applied to a key-less entry system in which the door of a vehicle is locked or unlocked in response to an operation of a pressed operation element, but the present invention is not limited to this configuration, and the present invention can be broadly applied to the key-less entry system in which the door of a vehicle is locked or unlocked in response to bringing an electronic key close to or far away from the door.

As described above, with the present invention, information can be easily provided to a vehicle by monitoring a remote control signal from an electronic key relating to a key-less entry system and starting up operations of a computer according to this remote control signal as a trigger to provide desired information to the vehicle, without requiring any specific operation by a user.

INDUSTRIAL APPLICABILITY

The present invention is directed to an information providing apparatus for a vehicle, a vehicle, and a method of providing information to the vehicle, and can be applied particularly to a vehicle having a key-less entry system.

The invention claimed is:

1. An information providing apparatus for transmitting desired information to information equipment loaded on a vehicle, comprising:
communication means for sending and receiving desired information using radio communications; and
control means for monitoring a remote control signal from an electronic key corresponding to a key-less entry system for the vehicle via said communication means,
for identifying the vehicle based on vehicle identification information included in the remote control signal,
for controlling operations of an information output means for storing information and sending said information to said vehicle as well as operations of the communication means, wherein said control means starts up operations of said information output means by using the remote control signal from said electronic key as a trigger to select desired information based on said vehicle identification information and transmit said selected desired information to said vehicle when a door of said vehicle is detected to be locked by said remote control signal, and
for controlling, in response to the remote control signal from said electronic key triggering said information output means to transmit said selected desired information to said vehicle, operations of an information input means for transferring driving information from said vehicle and storing said driving information.

2. An information providing apparatus for a vehicle according to claim 1, wherein said information output means sends said information via said communication means to said vehicle.

3. A vehicle to download desired information from a prespecified information storage means, the vehicle comprising:
a key-less entry system to receive a remote control signal from an electronic key, the remote control signal including information identifying the vehicle;
communication means for receiving said remote control signal from said electronic key; and
control means for transferring desired data via said communication means, wherein said control means executes an operation for locking a door of the vehicle with said remote control signal from the electronic key received by said communication means, initiates a transfer of said desired information from said prespecified information storage means to be received by said communication means in response to said door of the vehicle locking by said remote control signal, said acquired desired information selected based on the information identifying the vehicle included with said remote control signal, and initiates a transfer of driving information, in response to said remote control signal triggering said transferring of said selected desired information, via said communication means, to said prespecified information storage means.

4. The vehicle according to claim 3, wherein said control means sends and receives prespecified information with a sender of said information based on information received by said communication means according to said remote control signal as a trigger to execute processing for mutual authentication, and then acquires said desired information using a result of processing for the mutual authentication.

5. A method of providing information to a vehicle by transmitting desired information stored in prespecified information storage means to the vehicle, comprising:
starting up operations of said information storage means in response to a remote control signal from an electronic key relating to a key-less entry system of the vehicle as a trigger;
identifying the vehicle based on vehicle identification information included in said remote control signal;
selecting desired information based on the vehicle identification information;
determining whether a door of the vehicle is locked by said remote control signal;
transferring said selected desired information to the vehicle identified in said remote control signal when the door of the vehicle is determined to be locked; and
transferring driving information from the vehicle to said information storage means in response to said remote control signal triggering said transferring said selected desired information.

6. A method of providing information to a vehicle according to claim 5 further comprising:
providing said selected desired information via communication means relating to said remote control signal stored in said corresponding vehicle.

7. A method of providing information to a vehicle according to claim 5 further comprising:
executing processing for mutual authentication with said corresponding vehicle to provide said selected desired information using a result of processing for the mutual authentication.

8. An information providing apparatus for transmitting desired information to information equipment loaded on a vehicle, comprising:
- a communication unit configured to send and receive desired information using radio communications; and
- a control unit configured
  - to monitor a remote control signal from an electronic key corresponding to a key-less entry system for the vehicle via said communication unit,
  - to identify the vehicle based on vehicle identification information included in the remote control signal;
  - to control operations of an information output unit configured to store said information and send said information to said vehicle,
  - to control operations of said communication unit,
  - to select desired information based on the vehicle identification information;
  - to initiate operations of said information output unit using the remote control signal from said electronic key as a trigger to transmit said selected desired information to said vehicle identified in the remote control signal when a door of said vehicle is locked by said remote control signal, and
  - to control, in response to the remote control signal from said electronic key triggering said information output unit to transmit said selected desired information to said vehicle, operations of an information input unit for transferring driving information from said vehicle and storing said driving information.

9. An information providing apparatus for a vehicle according to claim 8, wherein said information output unit is further configured to send said information via said communication unit to said vehicle.

10. An information providing apparatus for a vehicle according to claim 1, wherein said driving information includes at least one of a driving time, a driving distance, and a driving area.

11. The vehicle according to claim 3, wherein said driving information includes at least one of a driving time, a driving distance, and a driving area.

12. A method according to claim 5, wherein said driving information includes at least one of a driving time, a driving distance, and a driving area.

13. An information providing apparatus for a vehicle according to claim 8, wherein said driving information includes at least one of a driving time, a driving distance, and a driving area.

14. A vehicle, comprising:
- a communication unit configured to receive a remote control signal from a locking mechanism of a door of the vehicle, the locking mechanism being configured to transmit the remote control signal when a key is inserted into the locking mechanism so as to cause the locking mechanism to lock;
- a storage unit configured to store driving information and desired information; and
- a control unit configured to transmit the driving information from the storage unit via the communication unit when the communication unit receives the remote control signal from the locking mechanism, and configured to receive desired information from an information storage unit remote from the vehicle via the communication unit when the communication unit receives the remote control signal from the locking mechanism and store the received desired information in the storage unit.

15. The vehicle according to claim 14, wherein the driving information includes at least one of a driving time, a driving distance, and a driving area.

16. The information providing apparatus according to claim 1, further comprising means for determining a next driver to operate the vehicle identified in the vehicle identification information, wherein said desired information is selected based on the next driver.

17. The information providing apparatus according to claim 1, wherein the selected desired information is transferred to said vehicle when a request to transfer the selected desired information is made from the control means to the vehicle within a predetermined amount of time of locking the door of said vehicle by said remote control signal.

18. The vehicle according to claim 3, wherein the control means initiates said transfer of said desired information from said prespecified information storage means in response to a request to transfer the selected desired information from the prespecified information storage means within a predetermined amount of time of locking the door of said vehicle by said remote control signal.

19. The method according to claim 5, further comprising:
- requesting said transferring of said selected desired information from the prespecified information storage means to the vehicle within a predetermined amount of time of the door of the vehicle being locked by said remote control signal, wherein the transferring said selected desired information is performed in response to said requesting being performed within the predetermined amount of time.

20. The information providing apparatus according to claim 8, wherein the selected desired information is transferred to said vehicle when a request to transfer the selected desired information is made from the control unit to the vehicle within a predetermined amount of time of locking the door of said vehicle by said remote control signal.

* * * * *